United States Patent [19]
Funaki

[11] Patent Number: 5,687,018
[45] Date of Patent: Nov. 11, 1997

[54] RECEIVING SYSTEM WITH SIGNAL TRANSMITTING SYSTEMS FOR TRANSMITTING AN INPUT SIGNAL AS A MODULATED BEAM WITH AN ADJUSTED BEAM INTENSITY

[75] Inventor: Hidefumi Funaki, Sendai, Japan

[73] Assignee: Tokin Corporation, Miyagi, Japan

[21] Appl. No.: 614,335

[22] Filed: Mar. 12, 1996

Related U.S. Application Data

[63] Continuation of Ser. No. 380,373, Jan. 30, 1995, abandoned.

[30] Foreign Application Priority Data

Feb. 10, 1994 [JP] Japan ................................ 6-016239

[51] Int. Cl.⁶ .............................. H01B 10/06; G02F 1/03
[52] U.S. Cl. ............................ 359/245; 359/194; 385/2
[58] Field of Search .............................. 359/154, 161, 359/173, 194, 245; 385/2

[56] References Cited

U.S. PATENT DOCUMENTS

| | | | |
|---|---|---|---|
| 4,887,900 | 12/1989 | Hall . | |
| 5,080,505 | 1/1992 | Epworth | 359/154 X |
| 5,225,922 | 7/1993 | Chraplyvy et al. | 359/124 |
| 5,227,908 | 7/1993 | Henmi | 359/173 X |
| 5,287,212 | 2/1994 | Cox et al. | 359/173 |

FOREIGN PATENT DOCUMENTS

| | | |
|---|---|---|
| A2-279602 | 8/1988 | European Pat. Off. . |
| A1-4309682 | 9/1994 | Germany . |
| A1-2253962 | 9/1992 | United Kingdom . |
| A1-2254746 | 10/1992 | United Kingdom . |

*Primary Examiner*—Mark Hellner
*Attorney, Agent, or Firm*—Frishauf, Holtz, Goodman, Langer & Chick

[57] ABSTRACT

A received system for receiving an input signal from an antenna includes a receiving device, and a signal transmitting system for transmitting the input signal as an optical beam signal, the signal transmitting system including a laser for irradiating a laser beam; an optical modulator for receiving the laser beam and the input signal with an input signal intensity and an input amplitude to produce a modulated beam having a beam intensity which is varied in response to the input amplitude and the input signal intensity; a photoelectric converter for converting the modulated beam from the optical modulator into an electric signal having a converted amplitude, the receiving device receiving and processing the electric signal as the input signal; a feedback control device for receiving the electric signal to produce a feedback control signal; and a laser control device for controlling the laser to adjust a beam intensity of the laser beam in response to the feedback control signal so that the converted amplitude is approximately equal to a constant amplitude regardless of variation of the input amplitude.

6 Claims, 8 Drawing Sheets

RECEIVING SYSTEM WITH SIGNAL TRANSMITTING SYSTEMS FOR TRANSMITTING AN INPUT SIGNAL AS A MODULATED BEAM WITH AN ADJUSTED BEAM INTENSITY This application is a Continuation of application Ser. No. 08/380,373, filed Jan. 30, 1995, now abandoned.

BACKGROUND OF THE INVENTION

The present invention relates to a receiving system of an input signal having a signal transmitting system which receives a laser beam and the input signal with an input signal intensity and produces a, the modulated beam having a beam intensity which is varied in response to the input signal intensity, the modulated beam being transferred and then converted into an electric signal which is applied to a receiving device.

In the manner which will later be described more in detail, a conventional signal transmitting system comprises a laser, an optical modulator, and a photoelectric converter. The optical modulator receives a laser beam from the laser and an input signal having an input signal intensity and an input amplitude. The optical modulator produces a modulated beam having a beam intensity which is varied in response to the input signal intensity. The photoelectric converter receives the modulated beam from the optical modulator to convert the modulated beam into an electric signal having a converted amplitude. A receiving device receives the electric signal from the photoelectric converter and processes it as the input signal.

Inasmuch as the beam intensity is dispersed in response to the input signal intensity when the input signal intensity has a variable signal intensity which is varied in an extremely large range, the receiving system has a small dynamic range.

SUMMARY OF THE INVENTION

It is a general object of the present invention to provide a signal transmitting system for transmitting an input signal as a modulated beam with a beam intensity adjusted.

It is a specific object of the present invention to provide a receiving system which has a large dynamic range by use of the signal transmitting system.

Other objects of this invention will become clear as the description proceeds.

According to the present invention, a signal transmitting system for transmitting an input signal as an optical beam signal with a beam signal adjusted, comprises a laser for irradiating a laser beam; an optical modulator for receiving the laser beam and the input signal with an input signal intensity and an input amplitude to produce a modulated beam having a beam intensity which is varied in response to the input amplitude and the input signal intensity; an optical waveguide for transmitting the modulated beam as the optical beam signal; a photoelectric converter connected to the optical waveguide for converting the modulated beam into an electric signal having a converted amplitude to produce an output signal of the system; a feedback control device connected to the photoelectric converter for receiving the electric signal to produce a feedback control signal; and a laser control device for controlling the laser to adjust a beam intensity of the laser beam in response to the feedback control signal so that the output signal has a substantially constant amplitude regardless of variation of the input amplitude.

In a modification, the feedback control signal can be taken out as the output signal of the system from the feedback control device.

According to another aspect of the present invention, a signal transmitting system for transmitting an input signal as an optical beam signal, comprises a laser for irradiating a laser beam; a first optical modulator for receiving the laser beam and the input signal with an input signal intensity and an input amplitude to produce a first modulated beam having a first beam intensity which is varied in response to the input amplitude and the input signal intensity, the first optical modulator having a first performance capability; a first optical waveguide connected to the first optical modulator for transmitting the first modulated beam as a first optical beam signal; a second optical modulator connected to the first optical waveguide for receiving the first modulated beam to produce a second modulated beam having a second beam intensity, the second optical modulator having a second performance capability which is substantially equal to the first performance capability; a second optical waveguide connected to the second optical modulator for transmitting the second modulated beam as a second optical beam signal; a photoelectric converter connected to the second optical waveguide for converting the second modulated beam into an electric signal having a converted intensity; a feedback control device connected to the photoelectric converter for receiving the electric signal to produce a feedback control signal and deliver the feedback control signal as an output signal for the system; and an optical modulator control device connected to the feedback control device for controlling the second optical modulator in response to the feedback control signal so that the second beam intensity is approximately equal to a constant beam intensity regardless of variation of the input signal intensity.

Further, there is provided a receiving system for reception of an input signal from an antenna which comprises a receiving device and the above-mentioned signal transmitting system according to the present invention, the signal transmitting system being used for transmitting the input signal from the antenna to the receiving device.

DESCRIPTION OF THE PREFERRED EMBODIMENTS

Figure 1:
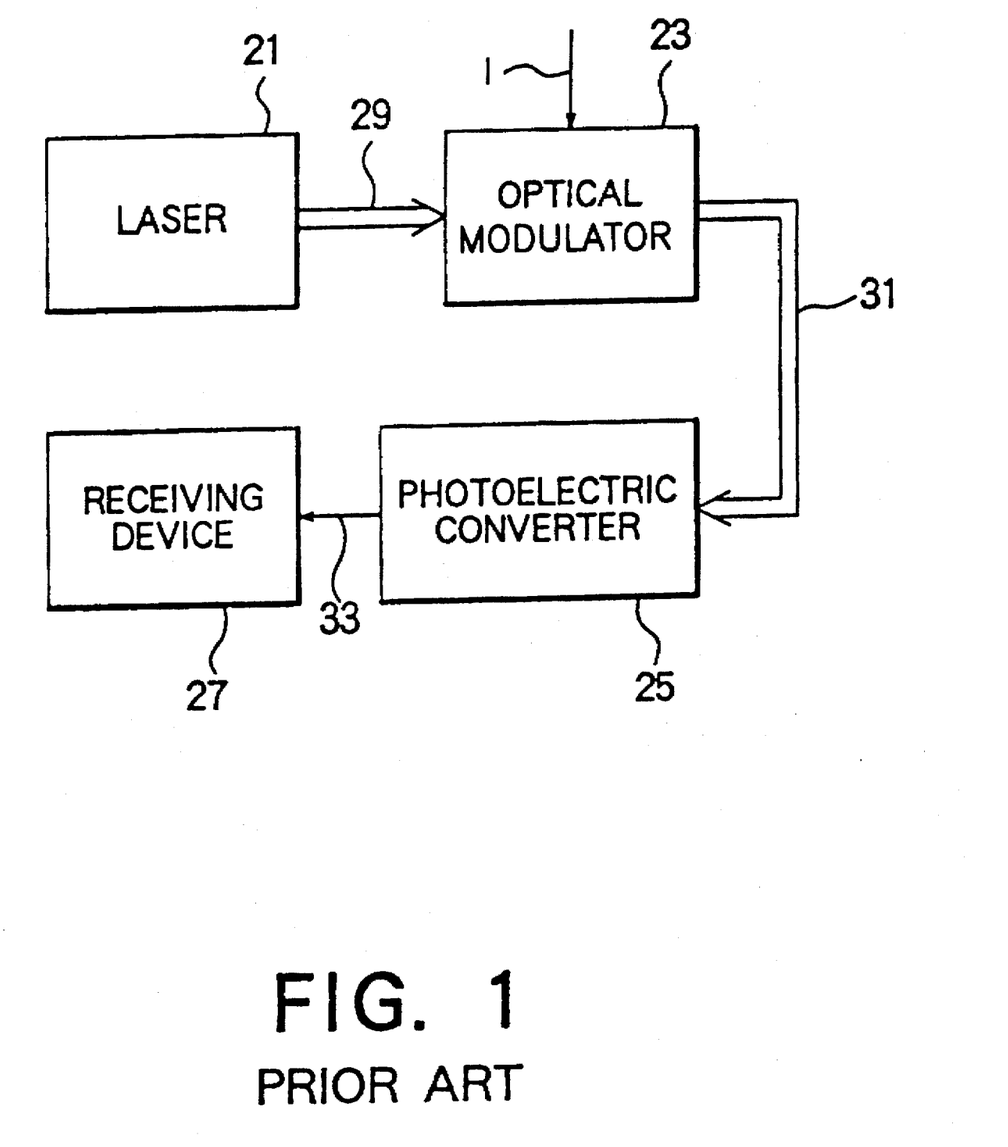
FIG. 1 is a block diagram of a conventional receiving system.

Referring to FIG. 1, a conventional receiving system will be described for a better understanding of this invention. The conventional receiving system comprises a receiving device 27 and a signal transmitting system which comprises a laser 21, an optical modulator 23, and a photoelectric converter 25. The optical modulator 23 is connected to the laser 21 and the photoelectric converter 25 by optical fibers 29 and 31. The photoelectric converter 25 is connected to the receiving device 27 by a lead wire 33.

The laser 21 irradiates a laser beam. The optical modulator 23 receives the laser beam from the laser 21 through the optical fiber 29. Also, the optical modulator 23 receives an input signal I through an antenna (not shown). The input signal is a high frequency signal. The input signal has an input signal intensity and an input amplitude. The optical modulator 23 modulates the laser beam by the input signal to produce a modulated beam having a beam intensity which is varied in response to the input amplitude and the input signal intensity.

The photoelectric converter 25 receives the modulated beam from the optical modulated 23 through the optical fiber 31 to convert the modulated beam into an electric signal having a converted amplitude. The receiving device 27 receives the electric signal from the photoelectric converter 25 through the lead wire 33 and processes it.

Inasmuch as the beam intensity is dispersed in response to the input signal intensity when the input signal intensity has a variable signal intensity which is varied in an extremely large range, the receiving system has a small dynamic range.

Referring to FIGS. 2, 3, 4, and 5, the description will proceed to a receiving system according to a first embodiment of this invention. Similar parts are designated by like reference numerals.

Figure 2:
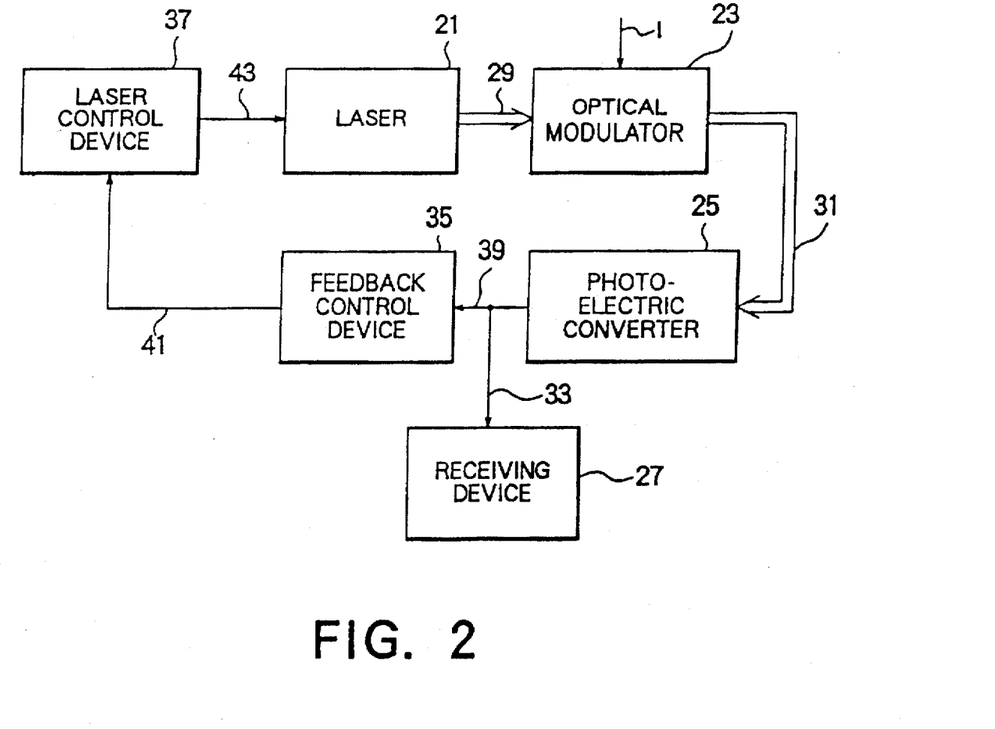
FIG. 2 is a block diagram of a receiving system according to a first embodiment of this invention.

In FIG. 2, a signal transmitting system used in the receiving system comprises the laser 21, the optical modulator 23, the photoelectric converter 25, a feedback control device 35, and a laser control device 37. The feedback control device 35 is connected to the photoelectric converter 25 and the laser control device 37 through lead wires 39 and 41. The laser control device 37 is connected to the laser 21 through a lead wire 43.

The receiving device 27 receives the electric signal from the photoelectric converter 25 through the lead wire 33. The feedback control device 35 receives the electric signal from the photoelectric converter 25 through the lead wire 39 to produce a feedback control signal in response to the electric signal. The laser control device 37 receives the feedback control signal from the feedback control device 35 through the lead wire 41. The laser control device 37 controls the laser 21 in response to the feedback control signal to adjust the laser beam intensity level so that the converted amplitude of the electric signal is approximately equal to a constant amplitude regardless of variation of the input amplitude and intensity of the input signal I.

Figure 3:
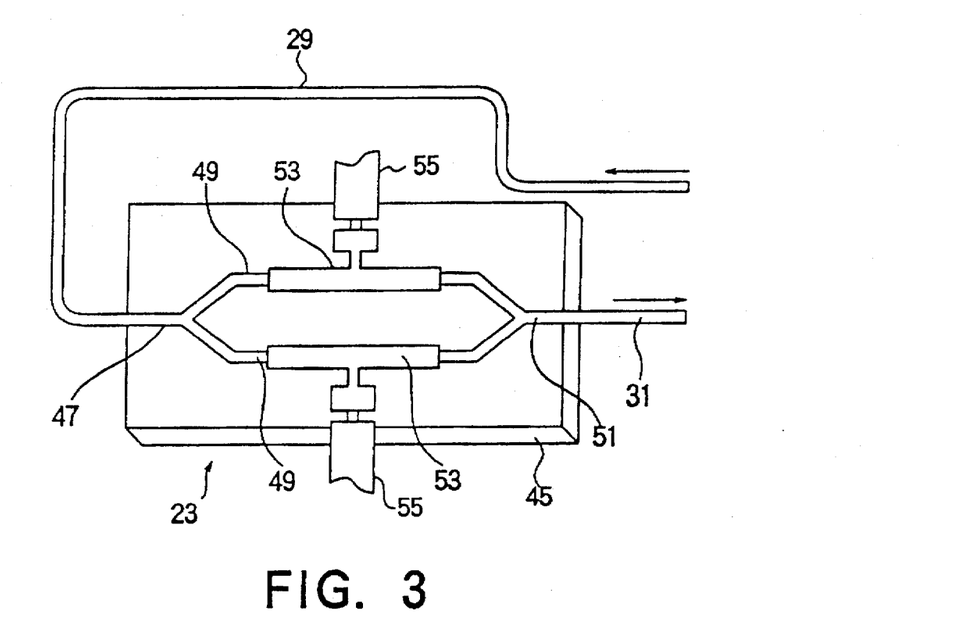
FIG. 3 is a schematic front view of an optical probe of the receiving system illustrated in FIG. 2.

In FIG. 3, the optical modulator 23 comprises a substrate 45, an incident optical waveguide 47 formed on the substrate 45, two phase-shift optical waveguides 49 formed on the substrate 45 to be branched from the incident optical waveguide 47, an outgoing optical waveguide 51 formed on the substrate 45 to join the phase-shift optical waveguides 49, and two modulation electrodes 53 formed on or in the vicinity of the phase-shift optical waveguides 49.

The modulation electrodes 53 are connected to antennas 55, respectively. The modulation electrodes 53 are supplied with the input signal I through the antennas 55 to make a variable electric field in response to the input signal I. The incident optical waveguide is connected to the optical fiber 29 and receives the laser beam from the laser 21 through the optical fiber 29. The outgoing optical waveguide 51 is connected to the optical fiber 31. Each of the phase-shift optical waveguides 49 has a variable refractive index varying in response to the variable electric field which is supplied by the modulation electrodes 53 when the modulation electrodes 53 are supplied with the input signal I. Depending upon an intensity of the variable electric field, the variable refractive indices of the phase-shift optical waveguides 49 are varied. This results in variation of phases of the laser beams transmitted through the phase-shift optical waveguides 49. The outgoing optical waveguide 51 joints the laser beams from the phase-shift optical waveguides 49 to produce and emit the modulated beam.

Figure 4:
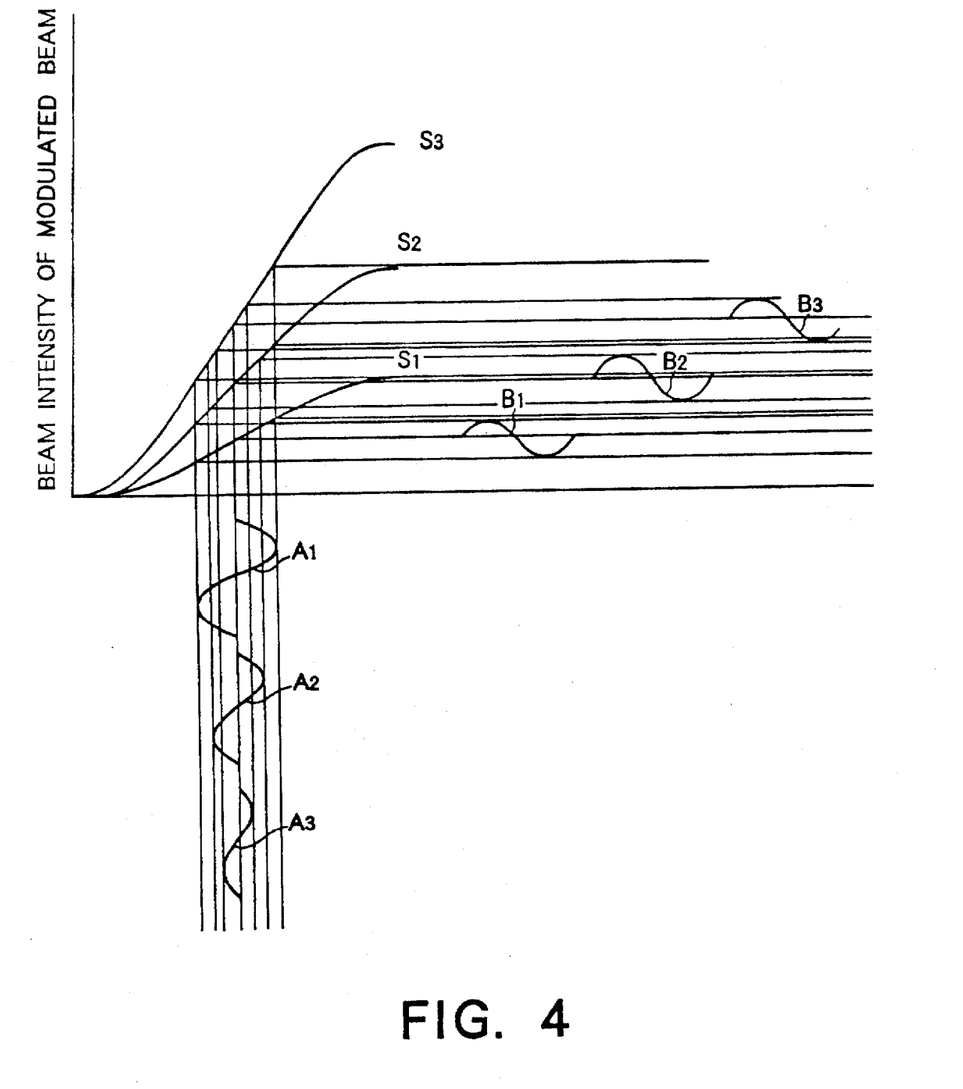
FIG. 4 is a graph for use in describing operation of the receiving system illustrated in FIG. 2.

For example, as shown in FIG. 4 at curved lines $S_1$, $S_2$, and $S_3$, a performance capability of the optical modulator 23 is varied. Also, it will be assumed that the input signal I is represented at curved lines $A_1$, $A_2$, and $A_3$. It will be assumed that the input signal I is represented at the curved line $A_1$ and the performance capability of the optical modulator 23 is represented at the curved line $S_1$, the beam intensity of the modulated beam from the optical modulator 23 is represented at the curved line $B_1$. It will be assumed that the input signal I is represented at the curved line $A_2$ and the performance capability of the optical modulator 23 is represented at the curved line $S_2$, the beam intensity of the modulated beam from the optical modulator 23 is represented at the curved line $B_2$. It will be assumed that the input signal I is represented at the curved line A3 and the performance capability of the optical modulator 23 is represented at the curved line $S_3$, the beam intensity of the modulated beam from the optical probe 23 is represented at the curved line $B_3$.

Figure 5A:
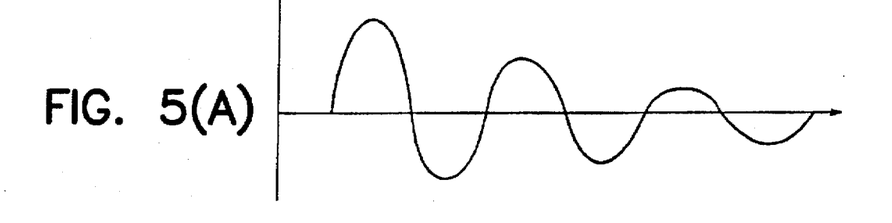
FIGS. 5(A) to 5(D) are other graphs for use in describing operation of the receiving system illustrated in FIG. 2.
Figures 5B, 5C:
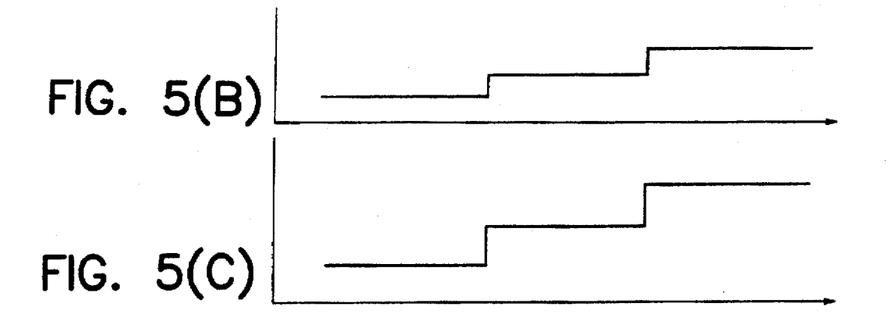
Figure 5D:
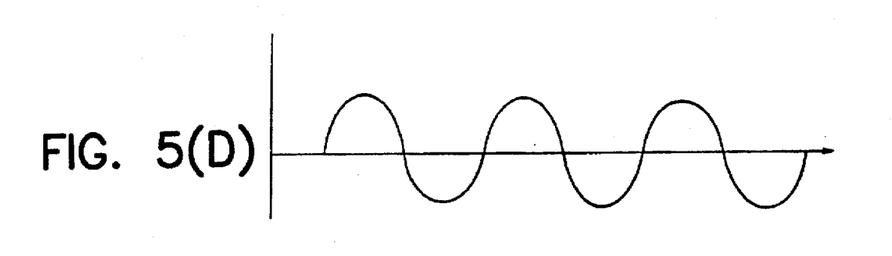

For example, it will be assumed that the input signal I is changed in its intensity as shown in FIG. 5(A), the feedback control signal from the feedback control device 35 is changed as shown in FIG. 5(B). The laser control device 37 controls the laser 21 so that the laser beam is changed in its intensity as shown in FIG. 5(C). In this event, the beam intensity of the modulated beam from the optical modulator 23 is adjusted as shown in FIG. 5(D). Accordingly, the electric signal from the photoelectric converter 25 has an adjusted amplitude as shown in FIG. 5(D). Namely, the converted amplitude of the electric signal is approximately equal to the constant amplitude regardless of the variation of the input amplitude of the input signal I.

Figure 6:
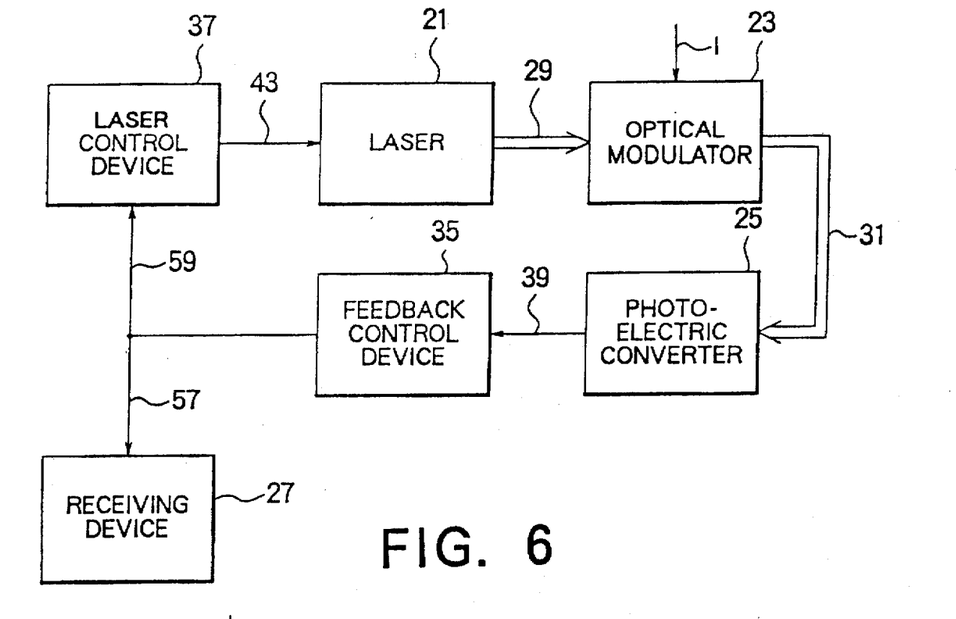
FIG. 6 is a block diagram of a receiving system according to a second embodiment of this invention.
Figure 7:
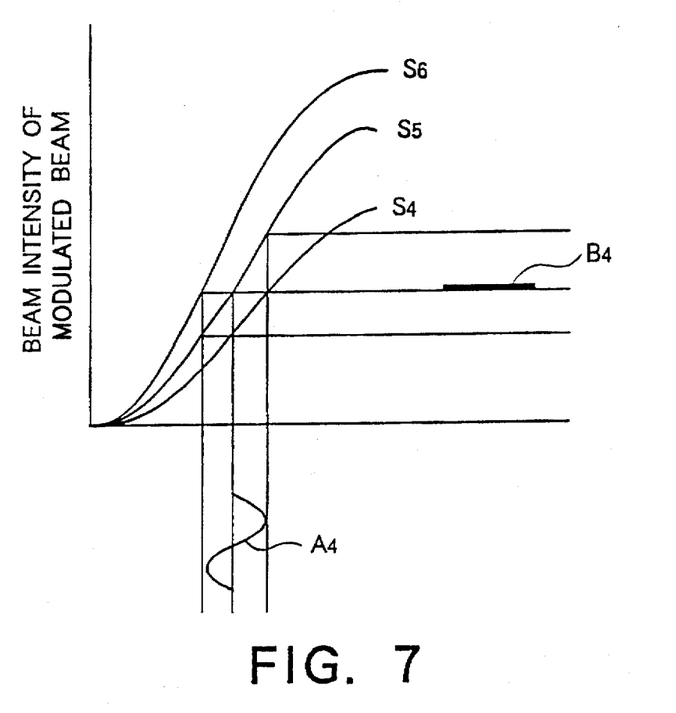
FIG. 7 is a graph for use in describing operation of the receiving system illustrated in FIG. 6.

Referring to FIGS. 6, 7, and 8, the description will proceed to a receiving system with a signal transmitting system according to a second embodiment of this invention. Similar parts are designated by like reference numerals.

In FIG. 6, the signal transmitting system comprises the laser 21, the optical modulator 23, the photoelectric converter 25, the feedback control device 35, and the laser control device 37, like in FIG. 2. The laser control device 37 is connected to the feedback control device 35 through a lead wire 59.

The receiving device 27 is connected not to the photoelectric converter 25, but rather, to the feedback control device 35 through a lead wire 57 and receives the feedback control signal from the feedback control device 35. The laser control device 37 receives the feedback control signal from the feedback control device 35. The laser control device 37 controls the laser 21 in response to the feedback control signal to adjust the laser beam intensity so that the beam intensity of the modulator beam from the optical probe 23 is approximately equal to a constant beam intensity regardless of variation of the input amplitude of the input signal I.

In FIG. 7, it is assumed that the performance capability of the optical modulator 23 is varied in process of time at curved lines $S_4$, $S_5$, and $S_6$ when the input signal I is represented at a curved line $A_4$. In this event, the beam intensity of the modulated beam from the optical modulator 23 is approximately equal to the constant beam intensity represented at a line $B_4$.

Figure 8A:
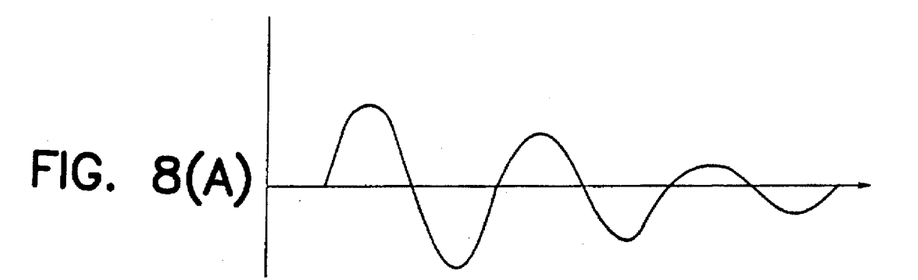
FIGS. 8(A) to 8(D) are other graphs for use in describing operation of the receiving system illustrated in FIG. 6.
Figure 8B:
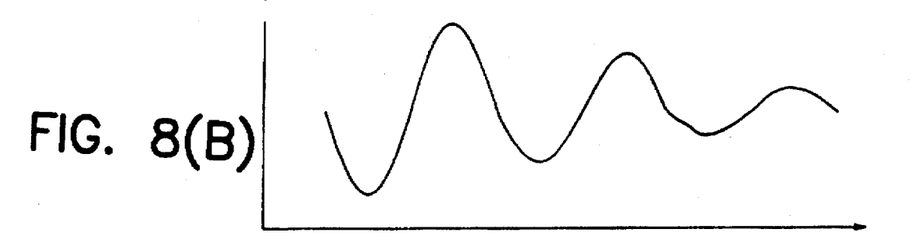
Figure 8C:
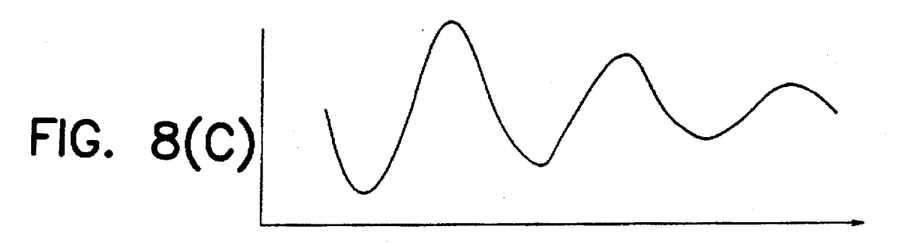
Figure 8D:
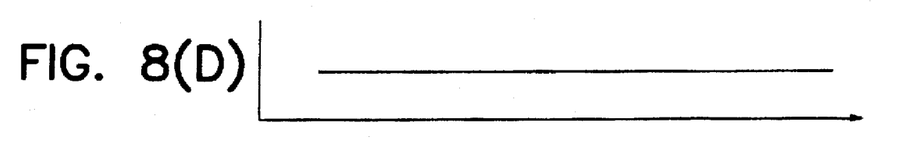

For example, when the input signal I changes in its intensity or amplitude as is represented in FIG. 8(A), the feedback control signal from the feedback control device 35 change in its amplitude as in FIG. 8(B). When the laser control device 37 receives the feedback control signal, the laser control device 37 controls the laser 21 in response to the feedback control signal so that the laser beam has an intensity as is represented in FIG. 8(C). In this event, the beam intensity of the modulated beam from the optical modulator 23 is approximately equal to the constant beam intensity as shown in FIG. 8(D).

Figure 9:
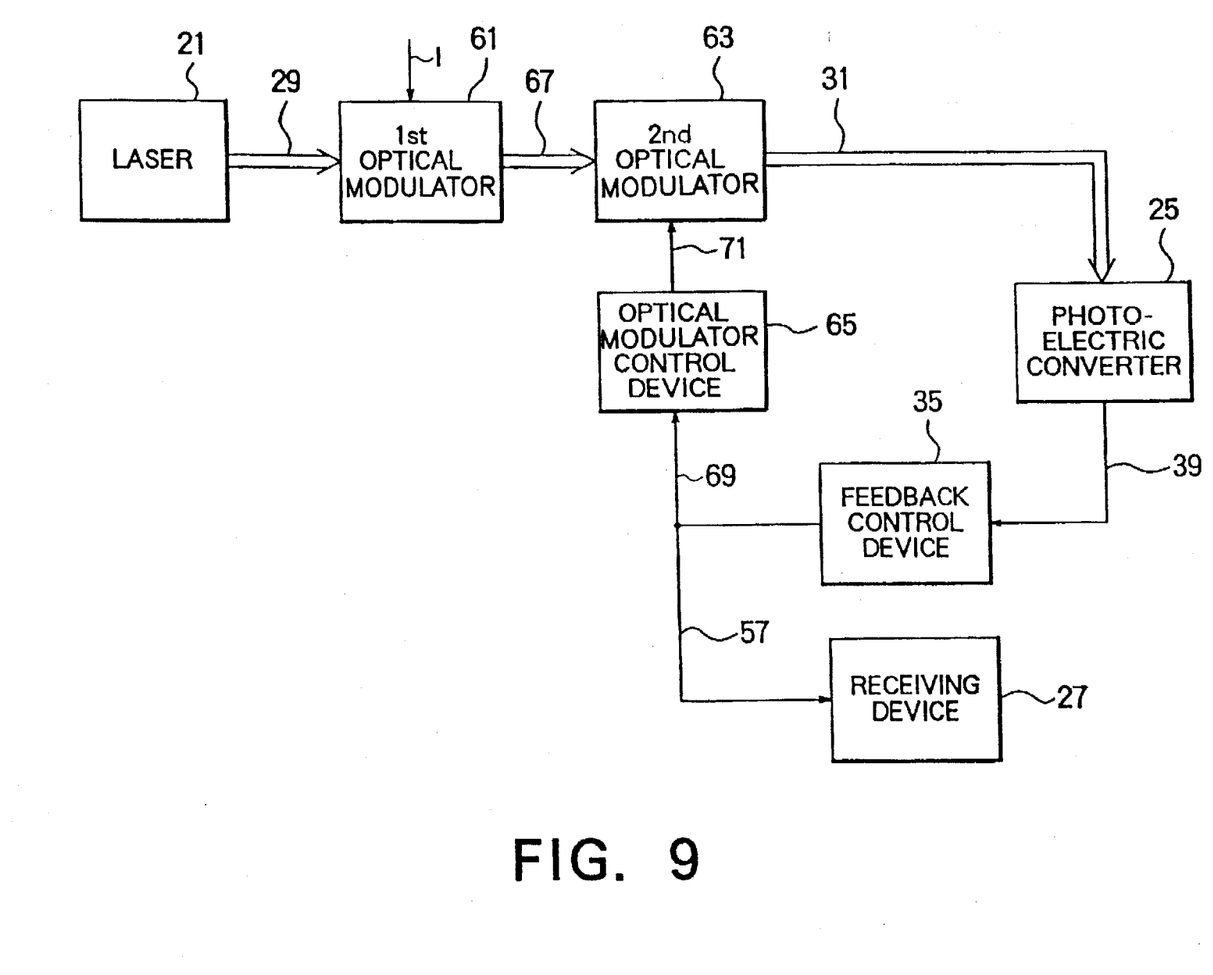
FIG. 9 is a block diagram of a receiving system according to a third embodiment of this invention.

Referring to FIGS. 9 and 10, the description will proceed to a receiving system using another signal transmitting system; according to a third embodiment of this invention. Similar parts are designated by like reference numerals.

In FIG. 9, the signal transmitting system comprises the laser 21, a first optical modulator 61, a second optical modulator 63, the photoelectric converter 25, the feedback control device 35, and an optical modulator control device 65. The first optical modulator 61 is connected to the laser 21 through the optical fiber 29. The second optical modulator 63 is connected to the first optical modulator 61 through an optical fiber 67. The optical modulator control device 65 is connected to the feedback control device 35 and the second optical modulator 63 through lead wires 69 and 71.

The first optical modulator 61 is equivalent to the optical modulator 23. The first optical modulator 61 receives the laser beam from the laser 21 and the input signal I and produces a first modulated beam having a first beam intensity which is varied in response to the input signal intensity of the input signal I. The first optical modulator 61 has a first performance capability.

The second optical modulator 63 is equivalent to the first optical modulator 61. The second optical modulator 63 has a second performance capability which is substantially equal to the first performance capability. The second optical modulator 63 receives the first modulated beam from the first optical modulator 61 and produces a second modulated beam having a second beam intensity. The photoelectric converter 25 receives the second modulated beam from the second optical modulator 63 and converts the second modulated beam into the electric signal having the converted intensity.

The optical modulator control device 65 receives the feedback control signal from the feedback control device 35. The optical modulator control device 65 controls the second optical modulator 63 in response to the feedback control signal so that the second beam intensity of the second modulated beam from the second optical probe 63 is approximately equal to a constant beam intensity regardless of variation of the input amplitude of the input signal I.

Figure 10A:
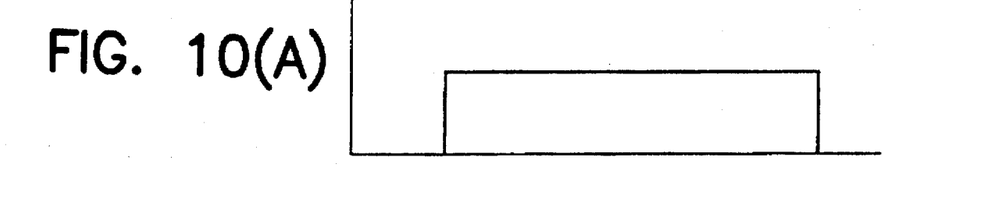
FIGS. 10(A) to 10(E) are graphs for use in describing operation of the receiving system illustrated in FIG. 9.
Figure 10B:
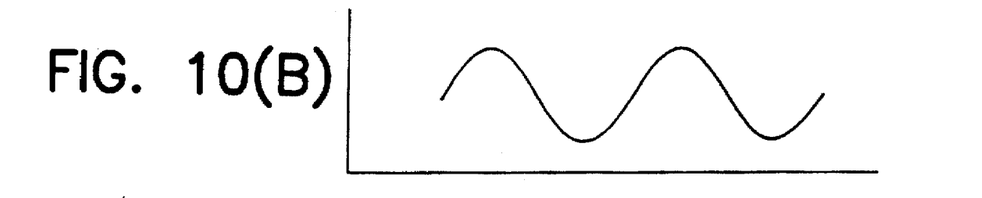
Figure 10C:
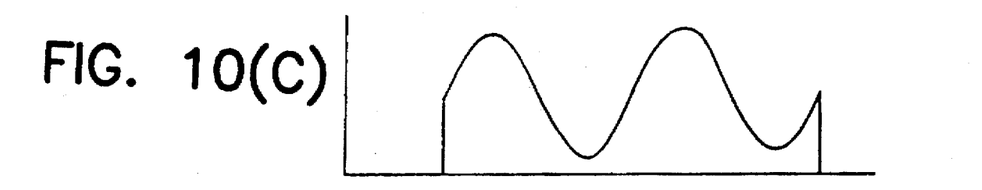
Figure 10D:
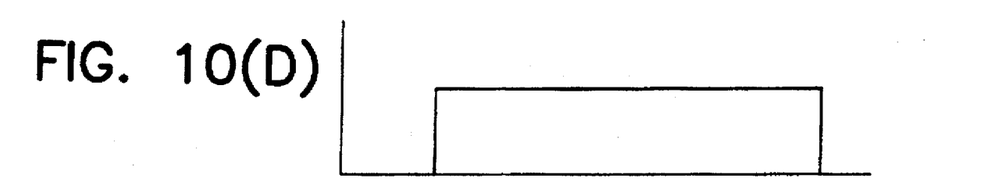
Figure 10E:
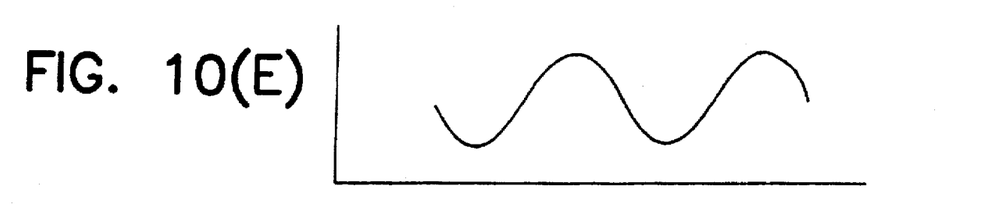

For example, when the laser beam from the laser 21 is constant in its intensity as shown in FIG. 10(A) and when the input signal I change in its intensity as shown in FIG. 10(B), the first beam intensity of the first modulated beam from the first optical modulator 61 is represented as shown in FIG. 10(C). In this event, the second beam intensity of the second modulated beam from the second optical modulator 63 is represented in FIG. 10(D). Namely, the second beam intensity is approximately equal to the constant beam intensity. Also, in this event, the feedback control signal from the feedback control device 35 is represented in FIG. 10(E).

What is claimed is:

1. A receiving system for receiving an input signal from an antenna, said receiving system comprising:

a receiving device, and a signal transmitting system for transmitting the input signal as an optical beam signal, said signal transmitting system comprising:

a laser for irradiating a laser beam;

an optical modulator for receiving said laser beam and said input signal with an input signal intensity and an input amplitude to produce a modulated beam having a beam intensity which is varied in response to said input amplitude and said input signal intensity;

a photoelectric converter for converting said modulated beam from said optical modulator into an electric signal having a converted amplitude, said receiving device receiving and processing said electric signal as said input signal;

a feedback control device for receiving said electric signal to produce a feedback control signal; and a laser control device for controlling said laser to adjust a beam intensity of said laser beam in response to said feedback control signal so that said converted amplitude is approximately equal to a constant amplitude regardless of variation of said input amplitude.

2. A receiving system for receiving an input signal from an antenna, said receiving system comprising:

a receiving device, and a signal transmitting system for transmitting the input signal as an optical beam signal, said signal transmitting system comprising:

a laser for irradiating a laser beam;

an optical modulator for receiving said laser beam and said input signal with an input signal intensity and an input amplitude to produce a modulated beam having a beam intensity which is varied in response to said input amplitude and said input signal intensity;

a photoelectric converter for converting said modulated beam from said optical modulator into an electric signal having a converted amplitude;

a feedback control device for receiving said electric signal to produce a feedback control signal, said receiving device receiving and processing said feedback control signal as said input signal; and a laser control device for controlling said laser to adjust a beam intensity of said laser beam in response to said feedback control signal so that said beam intensity is approximately equal to a constant beam intensity regardless of variation of said input amplitude.

3. A receiving system for receiving an input signal from an antenna, said receiving system comprising:

a receiving device, and a signal transmitting system for transmitting the input signal as an optical beam signal, said signal transmitting system comprising:

a laser for irradiating a laser beam;

a first optical modulator for receiving said laser beam and said input signal with an input signal intensity and an input amplitude to produce a first modulated beam having a first beam intensity which is varied in response to said input amplitude and said input signal intensity, said first optical modulator having a first performance capability;

a second optical modulator for receiving said first modulated beam to produce a second modulated beam having a second beam intensity, said second optical modulator having a second performance capability which is substantially equal to said first performance capability;

a photoelectric converter for converting said second modulated beam into an electric signal having a converted intensity;

a feedback control device for receiving said electric signal to produce a feedback control signal, said receiving device receiving and processing said feedback control signal as said input signal; and an optical modulator control device for controlling said second optical modulator in response to said feedback control signal so that said second beam intensity is approximately equal to a constant beam intensity regardless of variation of said input amplitude.

4. A signal transmitting system for transmitting an input signal as an optical beam signal, comprising:

a laser for irradiating a laser beam;

an optical modulator for receiving said laser beam and said input signal with an input signal intensity and an input amplitude to produce a modulated beam having a beam intensity which is varied in response to said input amplitude and said input signal intensity;

an optical waveguide for transmitting said modulated beam as said optical beam signal;

a photoelectric converter connected to said optical waveguide for converting said modulated beam into an electric signal having a converted amplitude to produce an output signal of said system;

a feedback control device connected to said photoelectric converter for receiving said electric signal to produce a feedback control signal; and a laser control device for controlling said laser to adjust a beam intensity of said laser beam in response to said feedback control signal so that said output signal has a substantially constant amplitude regardless of variation of said input amplitude.

5. A signal transmitting system for transmitting an input signal as an optical beam signal, comprising:

a laser for irradiating a laser beam;

an optical modulator for receiving said laser beam and said input signal with an input signal intensity and an input amplitude to produce a modulated beam having a beam intensity which is varied in response to said input amplitude and said input signal intensity;

an optical waveguide for transmitting said modulated beam as said optical beam signal;

a photoelectric converter connected to said optical waveguide for converting said modulated beam into an electric signal having a converted amplitude;

a feedback control device receiving said electric signal to produce a feedback control signal and to deliver said feedback control signal as an output signal of said system; and a laser control device connected to said feedback control device for controlling said laser to adjust a beam intensity of said laser beam in response to said feedback control signal so that said beam intensity is approximately equal to a constant beam intensity regardless of variation of said input signal intensity.

6. A signal transmitting system for transmitting an input signal as an optical beam signal, comprising:

a laser for irradiating a laser beam;

a first optical modulator for receiving said laser beam and said input signal with an input signal intensity and an input amplitude to produce a first modulated beam having a first beam intensity which is varied in response to said input amplitude and said input signal intensity, said first optical modulator having a first performance capability;

a first optical waveguide connected to said first optical modulator for transmitting said first modulated beam as a first optical beam signal;

a second optical modulator connected to said first optical waveguide for receiving said first modulated beam to produce a second modulated beam having a second beam intensity, said second optical modulator having a second performance capability which is substantially equal to said first performance capability;

a second optical waveguide connected to said second optical modulator for transmitting said second modulated beam as a second optical beam signal;

a photoelectric converter connected to said second optical waveguide for converting said second modulated beam into an electric signal having a converted intensity;

a feedback control device connected to said photoelectric converter for receiving said electric signal to produce a feedback control signal and to deliver said feedback control signal as an output signal of said system; and an optical modulator control device connected to said feedback control device for controlling said second optical modulator in response to said feedback control signal so that said second beam intensity is approximately equal to a constant beam intensity regardless of variation of said input signal intensity.

* * * * *